(12) United States Patent
Hecht et al.

(10) Patent No.: US 12,457,155 B2
(45) Date of Patent: Oct. 28, 2025

(54) FLOW ORCHESTRATION FOR NETWORK CONFIGURATION

(71) Applicant: Ribbon Communications Operating Company, Inc., Westford, MA (US)

(72) Inventors: Inbal Hecht, Petah Tikva (IL); Efraim Gelman, Petah Tikva (IL); Shirel Ezra, Petah Tikva (IL); Ziv Shem-Tov, Petah Tikva (IL); Hayim Porat, Petah Tikva (IL)

(73) Assignee: Ribbon Communications Operating Company, Inc., Westford, MA (US)

( * ) Notice: Subject to any disclaimer, the term of this patent is extended or adjusted under 35 U.S.C. 154(b) by 547 days.

(21) Appl. No.: 17/669,435

(22) Filed: Feb. 11, 2022

(65) Prior Publication Data

US 2023/0261942 A1   Aug. 17, 2023

(51) Int. Cl.
*H04L 41/083* (2022.01)
*H04L 41/08* (2022.01)
*H04L 41/0816* (2022.01)
*H04L 41/0869* (2022.01)

(52) U.S. Cl.
CPC ........ *H04L 41/083* (2013.01); *H04L 41/0816* (2013.01); *H04L 41/0869* (2013.01); *H04L 41/0886* (2013.01)

(58) Field of Classification Search
CPC ............... H04L 41/083; H04L 41/0816; H04L 41/0869; H04L 41/0886
See application file for complete search history.

(56) References Cited

U.S. PATENT DOCUMENTS

| 11,095,533 | B1* | 8/2021 | Hermoni | H04L 43/067 |
| 11,405,801 | B1* | 8/2022 | Qureshi | G05D 1/104 |
| 11,411,855 | B1* | 8/2022 | Flamini | H04L 41/0816 |
| 2004/0205236 | A1* | 10/2004 | Atkinson | H04L 41/0668 370/351 |
| 2014/0040855 | A1* | 2/2014 | Wang | G06F 30/327 717/107 |
| 2015/0293512 | A1* | 10/2015 | Egge | G06F 16/212 703/2 |
| 2016/0191370 | A1* | 6/2016 | Wood | H04L 41/122 370/238 |

(Continued)

*Primary Examiner* — Kamal B Divecha
*Assistant Examiner* — Sujana Khakural
(74) *Attorney, Agent, or Firm* — Haynes and Boone, LLP

(57) ABSTRACT

According to one example, a method performed by a computing system includes receiving a request for optimizing a communication network, the request defining a set of demands for the communication network, each demand of the set of demands having two or more endpoints, a diversity policy, a number of routes, and a set of constraints. The method further includes selecting a subset of optimization functions from a set of optimization functions, the selecting being based on characteristics of the communication network and a decision tree. The method further includes using the selected subset of optimization functions, determining an initial solution for the communication network, the initial solution comprising assignment of routes within demands of the set of demands. The method further includes, within a time constraint, iteratively applying an updated subset of optimization functions with modified parameters to reduce a cost of the initial solution to produce an optimal solution.

24 Claims, 7 Drawing Sheets

(56) References Cited

U.S. PATENT DOCUMENTS

| | | | | |
|---|---|---|---|---|
| 2016/0373997 | A1* | 12/2016 | Petersen | H04W 72/20 |
| 2019/0141113 | A1* | 5/2019 | Ganapathi | G06N 7/01 |
| 2019/0319702 | A1* | 10/2019 | Gazzola | H04B 10/075 |
| 2020/0028746 | A1* | 1/2020 | Zawadzki | H04L 43/0876 |
| 2020/0029240 | A1* | 1/2020 | Li | H04L 65/80 |

* cited by examiner

FLOW ORCHESTRATION FOR NETWORK CONFIGURATION

BACKGROUND

A communication network infrastructure, such as the Internet, can be composed of a large number of network nodes that are connected among one another. Network nodes refer to network components (e.g., clients, servers, microservices, virtual machines, serverless code instances, IoT devices, etc.) that communicate with one another according to predetermined protocols by means of wired or wireless communication links. The communication network provides services to users according to requirements of the services, such as quality of service (QoS) commitments. Different types of services with different QoS requirements may be provided by the communication network via different service links formed by the network nodes deployed in the network.

SUMMARY

A method performed by a computing system includes receiving a request for optimizing a communication network, the request defining a set of demands for the communication network, each demand having two or more endpoints, a diversity policy, and a number of routes. The method further includes selecting a subset of optimization functions from a set of optimization functions, the selecting being based on characteristics of the communication network and a decision tree. The method further includes using the selected subset of optimization functions, determining an initial solution for the communication network, the initial solution comprising assignment of each of the routes within some of the demands. The method further includes, within a predefined time constraint, iteratively applying the subset of optimization functions with modified parameters to reduce a cost of the initial solution to produce an optimal solution.

A method performed by a computing system includes receiving a request for network optimization, the request defining a set of demands. The method further includes selecting one or more optimization functions from a set of optimization functions, the selecting being based on some characteristics of the network associated with the request. The method further includes using the selected one or more optimization functions, determining an initial solution for each of the demands. The method further includes, while time is remaining under a predefined time constraint, iteratively applying the one or more selected optimization functions with varying configurations to improve solution ranking.

A computing system includes a processor and memory comprising machine readable instructions that when executed by the processor, cause the system to receive a request for optimizing a communication network, the request defining a set of demands for the communication network, each demand having two or more endpoints, a diversity policy, and a number of routes. The system is further to select a subset of optimization functions from a set of optimization functions, the selecting being based on characteristics of the communication network and a decision tree. The system is further to use the selected subset of optimization functions, determining an initial solution for the communication network, the initial solution comprising assignment of each of the routes within each of the demands. The system is further to within a predefined time constraint, iteratively apply the subset of optimization functions with modified parameters to improve the ranking of the initial solution to produce an optimal solution.

BRIEF DESCRIPTION OF THE DRAWINGS

Aspects of the present disclosure are best understood from the following detailed description when read with the accompanying figures.

Figure 1:
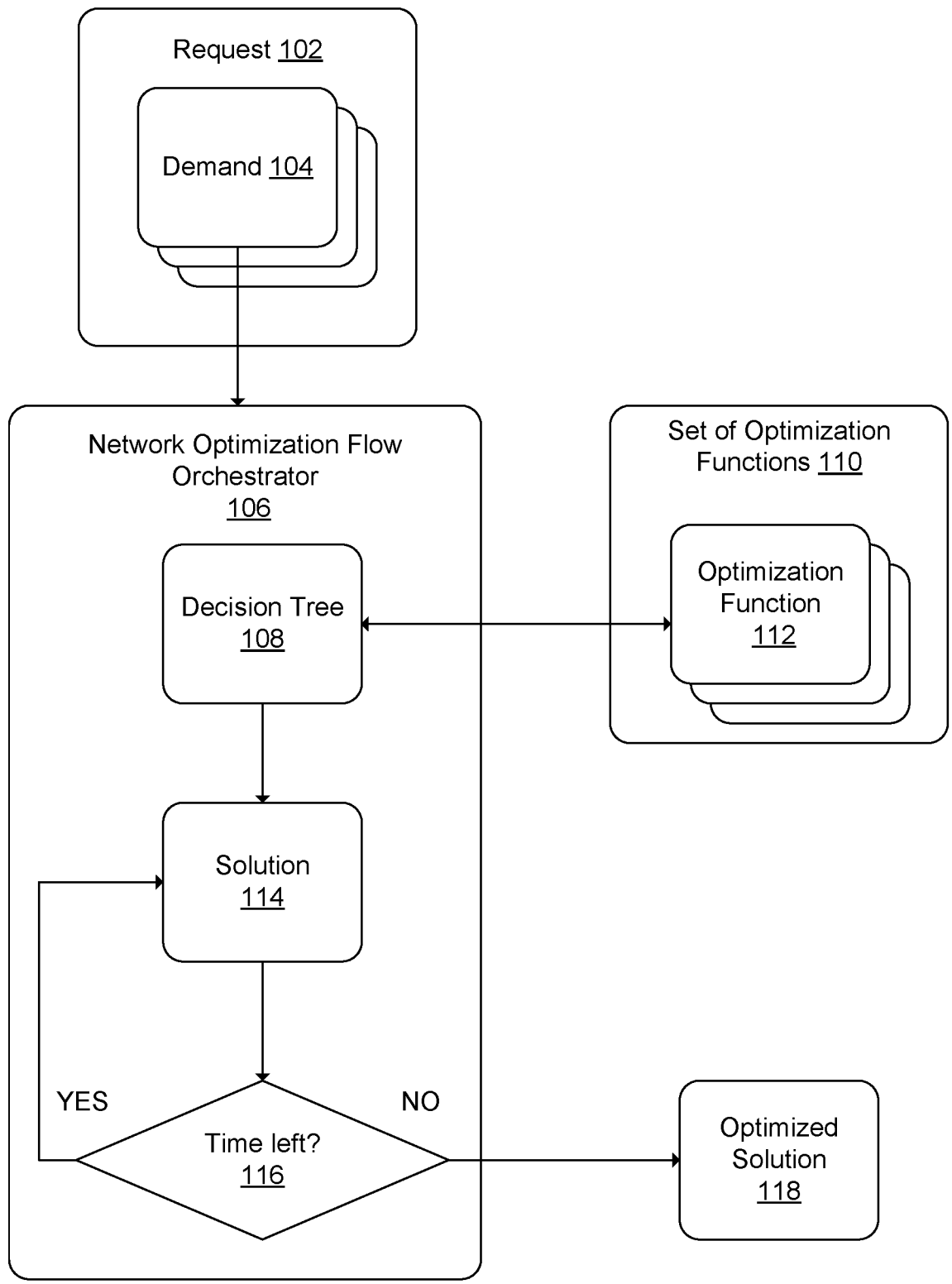
FIG. 1 is a diagram showing network configuration using a flow orchestrator that selects among a plurality of optimization functions based on a decision tree, according to one example of principles described herein.

In the figures, elements having similar designations may or may not have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

In a communication network, resources for services are allocated and optimized according to a current state of the network and the demands associated with that network. It is often desirable to satisfy the service demand with a minimal number of resources (e.g. service links, which are optical channel (OCH) trails that are created with optical transceivers). Further, when a network link failure occurs, there is a need to provide restoration schemes to services that are impacted by the network link failure. For a large communication network involving a large number of network nodes, the computational complexity to determine the ideal network setup and the restoration schemes can be high. A computationally efficient method to provide suitable network optimization, including specified restoration schemes in case of a network link failure is desired. It is also desired that a minimal amount of resources is used to satisfy the service demands in the communication network so as to minimize the cost of operating the network.

Networks are designed to handle a variety of service demands. Service demands may include Optical Channel (OCH), Optical Channel Data Unit (ODU), and Internet Protocol (IP). A service demand may be defined by at least two endpoints, a required volume of traffic between those endpoints, a defined resiliency scheme (also referred to as a protection scheme), and a diversity policy.

Network optimization may involve for example establishing service links to satisfy the service demands with all of their traffic and redundancy requirements and with a minimal cost (e.g., minimal use of computing system and network resources). Examples of resources that may be optimized include, e.g., service links, chassis, line cards, fabrics, and the like. Various mathematical models may be used to solve this optimization problem. However, the optimization problem has become increasingly complex as the size and complexity of communication networks increases. The mathematical models are designed to consider many variables, such as the physical nodes and links within the network, the nature of the service demands, which may involve thousands of service links, each service link being associated with a defined number of backup routes in the event of a link failure. Moreover, the mathematical models consider various constraints, such as the length of a particular link, Optical Signal to Noise Ratio (OSNR) for optical fiber lines, monetary cost, cross-connect sites, allowed area identifiers, available wavelengths for optical links.

Network optimization using certain mathematical models that consider the constraints and variables described above is a non-deterministic polynomial-time (NP)-hard problem. An NP-hard problem is one in which, given a particular solution, it is impossible to verify that solution in polynomial time. In other words, even if a particular solution is determined, it is not possible to mathematically verify that there is not a better solution, in polynomial time. NP-hard problems differ from NP-complete problems. With an NP-complete problem, it is impossible to find a solution deterministically in polynomial time. However, a known solution can be verified in polynomial time. Hence, network optimization, in general, requires methods of approximations and heuristics and it is not usually possible to assess the optimality of a specific solution.

According to principles described herein, a network optimization technique utilizes a subset of available network optimization functions based on the type of network and other factors. Such techniques provide a solution that may be satisfactory for a particular network at a given time, even though it cannot be mathematically proven to be the most optimal solution. As will be explained in further detail below, the principles described herein aim to solve the network optimization problem for a specific use case and not for the general case. Different heuristics and methods are used for different use cases. Use cases may be defined by the size (large/small) of a network as well as the topology (rings/tails/bottlenecks) of the network, or by other characteristics of the optimization input (e.g. the demands number and topology, diversity policy, etc.) or configuration (e.g. the available computational resources, time limit, etc.). The specific subsets of network optimization functions and techniques to be used for a given use case may be defined by a decision tree.

In one example of principles described herein, a request for network optimization is issued. That request defines a set of demands for a particular network. Each demand may define at least two endpoints, a diversity policy, and a number of routes. Using the information in the request, a subset of optimization functions is selected from a set of available optimization functions. These optimization functions may include various network optimization techniques such as (but not limited to) a minimal-cost flow function, an integer linear programming function, a path finding with excluded edges function, an in-out graph, Djikstra's algorithm, and Yen's algorithm. Some of the optimization functions may be assigned with a set of parameter values. The selected subset of optimization functions and parameters may be based on characteristics of the optimization input and a decision tree. The decision tree may be hardcoded, rule-based, or dynamically updating based on a machine learning function. Using the selected subset of optimization functions, an initial solution may be determined within a time constraint. The solution defines a set of service links to be established on the network, or in other words, an assignment of routes. This solution may not be the best solution, for the reasons mentioned above. If there is remaining time within the time constraint, then further modifications to the selected subset of optimization functions and parameters may be made to see if a better solution can be found (i.e., one that meets the service demands at a lower cost). Once the time constraint is met, then the best solution is deemed the optimal solution.

FIG. 1 is a diagram showing network configuration using a flow orchestrator that selects among a plurality of optimization functions based on a decision tree. According to the present example, a request 102, which includes a set of service demands 104, is provided to a network optimization flow orchestrator 106. The request 102 may be from an entity that desires to establish service links over a network and would like to do so in an optimal manner. The request 102 may be presented to an organization such as a company or division within a company that provides network optimization services. The request 102 may define a specific network (or portion of a specific network) over which the service links are to be established. Service links are defined routes between nodes in a network. Nodes may be, for example, a network server.

The service demands 104 identified in the request 102 may range in number, over several orders of magnitude. Generally, requests with larger sets of demands are more complicated and thus the optimal solution is more difficult to derive. Each service demand identifies at least two endpoints (e.g., nodes within a network). Each service demand also defines the desired characteristics of a route between those nodes, such as what bandwidth is required. Other characteristics are contemplated as well, including bit rate and baud, and/or specific constraints on the requested routes.

The network optimization flow orchestrator 106 uses a decision tree 108 to select a subset of optimization functions 112 from a set of optimization functions 110 to produce an initial solution 114. As will be explained in further detail below, the subset of selected optimization functions 112 may be dynamically updated, whereas the set of optimization functions 110 represents the universe of available functions. If there is time left under a time constraint, it is decided at process 116 to modify the optimization functions and/or the parameters to try and find a better solution. Once the time constraint has expired, an optimized solution 118 (the best solution found so far) is produced.

The service demand also defines the desired redundancy scheme. If a connection between nodes in a network goes down, it is desirable to have a backup route by which traffic will be routed. Connections between nodes in a network may go down for a variety of reasons, including power outages, server failures, or severed cables. The service demands may also define a diversity policy, which defines the resources that may be shared between the Work and Protection routes. For example, if several service links utilize a set of fiber optic cables in the same conduit, these service links belong to the same Shared Risk Link Group (SRLG), as they may all be affected by a single conduit failure. Similarly, several service links that pass through the same node in the network form a Shared Risk Node Group (SRNG), as they are all susceptible to this site's failure. The diversity policy defines whether the different routes assigned for a demand may deviate from each other by their links, SRLG or SRNG.

The network optimization flow orchestrator 106 includes the hardware and software for performing network optimization according to principles described herein. The network optimization flow orchestrator 106 utilizes a subset of network optimization functions that are available and selects a particular flow of optimization functions for a given set of demands defined in the request 102. The subset may include from one to all of the available optimization functions. The network optimization flow orchestrator 106 utilizes a decision tree 108 to select this subset of optimization functions.

The decision tree 108 informs the network optimization flow orchestrator 106 as to which subset of optimization functions 112 should be used for the given request at any step. The network optimization flow orchestrator 106 may consider the type of network over which the service links are to be formed, as well as the nature of the demands within the request to reach a decision as to which optimization functions and parameters will be used in accordance with the decision tree 108. In some examples, the decision tree may be hardcoded, namely include a fixed subset of optimization functions and/or parameters. In other cases, the decision tree may be rule-based according to a-priori known elements such as which optimization functions are useful for which type of networks or which types of service demands. In some examples, the decision tree 108 may be dynamically updated based on machine-learning techniques.

In one example, the decision tree is hardcoded. The hardcoded decision tree may be represented by a configuration file such as an eXtensible Markup Language (XML) file that includes a predefined list of strategies. Other types of files are contemplated as well. These predefined strategies may include one or more optimization functions to be applied to the optimization problem with various parameter values, number of repetitions, and time limits.

In one example, the decision tree is rule-based. In one example, the rule-based decision tree may be implemented by starting with a basic hardcoded, fast strategy. After execution of that basic strategy, the execution times of various components of the strategy may be probed. Using the execution time data, as well as any other data obtained during the initial strategy, the parameters of the basic strategy may be updated and a further iteration may be performed. Again, data from that iteration may be collected and fed back to subsequent iterations until a global time constraint is reached. After the global time constraint is reached, the best solution found thus far is deemed the final output or optimal solution.

In one example, the decision tree is dynamically updated based on machine-learning. Machine-learning involves deriving a model from a set of inputs that produce a set of outputs. As more sets of data are fed into the model, the model is improved. This improvement of the model is referred to as training the model. Training the model may involve testing the same problem with different configurations and parameters. The results from each of these tests may then be evaluated and ranked by the quality of the solutions they produce. The quality of a solution may consider factors such as the overall cost, the execution time for determining the solution, and other metrics such as the number of different restoration routes per demand, number of wavelength changes in restoration, etc. The model may further be trained with varying sets of data such as different numbers of services per demand, different protection schemes, different length bounds and capacity, and random constraints. The trained model can then be used to create a decision tree that determines specific subsets of optimization functions and optimization flows with ideal configuration and parameters as determined from the model.

Using the decision tree 108, the network optimization flow orchestrator 106 selects a subset of optimization functions 112 from a suite or full set of optimization functions 110. Additionally, in the cases where more than one optimization function is selected, the network optimization flow orchestrator 106 may determine the order and manner in which those optimization functions are applied. The set of optimization functions used, and the order and manner in which they are applied, will be referred to as the optimization flow. Examples of the optimization functions that make up the optimization flow include, but are not limited to, a minimal-cost flow function, an integer linear programming function, a path finding with excluded edges function, an in-out graph, Djikstra's algorithm, and Yen's algorithm. More details on these optimization functions will be provided below.

The network optimization flow orchestrator 106 uses the optimization flow determined by the decision tree 108 to produce an initial solution 114. The initial solution is derived using an initial set of parameters for the optimization functions in the optimization flow. The initial solution 114 may define routes through the network to satisfy the demands included in the request. Again, this initial solution may not be the upmost optimal solution. Accordingly, it is desirable to adjust the parameters of the optimization functions within the optimization flow to see if a better solution can be found (i.e., an alternate set of service links and routes that meet the service demands of the request at a lower cost). In some cases, a different subset of optimization functions may be used. In other words, different optimization functions out of the full suite of optimization functions may be used. Thus, through each iteration, the subset of selected network optimization functions may either stay the same or may change.

Executing the optimization functions may be a processor-intensive task that consumes a large amount of computing resources. Moreover, as time goes on, the improvement in the solution is reduced. In other words, the amount of processing resources spent versus the improvement in the solution goes down. Thus, according to principles described herein, a time constraint is placed on how many iterations may be performed. Accordingly, at process 116, the network optimization flow orchestrator 106 determines whether there is time left under the time constraint. If there is indeed time left under the time constraint, then the network optimization flow orchestrator 106 runs another iteration with the same or different parameters of the same or different subset of optimization functions to determine if a better solution can be found. If, however, the time under the time constraint has expired, the network optimization flow orchestrator 106 selects the best solution that has been found thus far and deems that the final optimized solution 118.

The time constraint may be selected for various goals. Typically, a longer running time may yield better results, but has a diminishing return on cost improvement. For example, in some cases it may be preferred to maximize the gain by selecting a time constraint that will maximize a ratio of a solution improvement over a delta in execution time. The time constraint may thus vary from minutes to hours depending on how long the user wishes to utilize the processing resources and incur the processing costs of finding an optimal solution. In some examples, the time constraint may be set to reach a target solution quality. The target solution quality may be defined by various metrics, such as a target cost. Other factors for solution quality may be considered as well.

The optimized solution 118 is the best solution found within the constraints defined. It defines the routes by which the service links are to be established through the network to meet the demands with minimal cost. The process for obtaining the optimized solution may be repeated on an as-needed basis. Optimization may take place when planning a new network, adding equipment to an existing network, or re-shuffling services using the existing equipment to improve efficiency. Such optimization techniques may be useful for network service providers to improve their network services, private companies to improve their own large/complex networks, and/or third-party entities offering their optimization services to others. Other situations where network optimization is useful are also contemplated as being benefitted by principles described herein.

Figure 2:
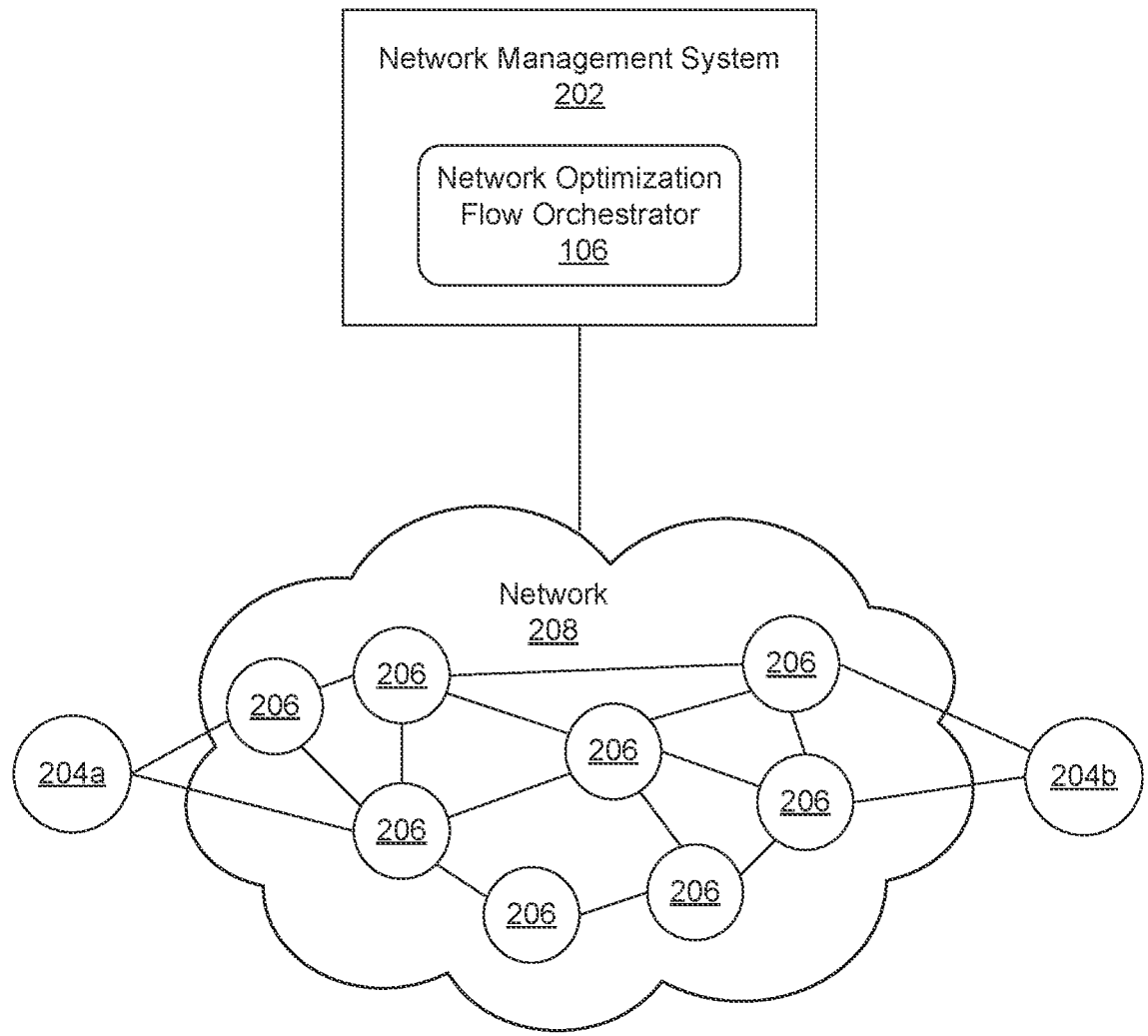
FIG. 2 is a diagram showing an illustrative network over which service links may be established, according to one example of principles described herein.

FIG. 2 is a diagram showing an illustrative communication network over which service links may be established. The communication network 200 includes, for example, a network 208, network management system 202, endpoints 204a, 204b, and nodes 206. The nodes 206 may be, for example, network device such as servers, routers, and other network components. The endpoints 204a, 204b may be, for example, client devices. In some examples, the endpoints may be other network nodes. In the network 208, network devices may provide data services to client devices. The network devices may be hardware-based or software-based switches, routers, splitters, or the like that facilitate delivery of data services to client devices. The components and arrangements shown in FIG. 1 are not intended to limit the disclosed examples, as the system components used to implement the disclosed processes and features can vary. For example, each network device may be associated with no, one, or many client devices. In various examples, the network 208 may be based on one or more of on-premises network environments, virtualized (cloud) network environments, or combinations of on-premises and cloud networks. Consistent with examples described herein, various types of data may be communicated over services in the network, including Internet (e.g., IP protocol) data, telephony or telecommunications data, Voice over IP (VOIP), video conference traffic, cellular data, proprietary network data, and more.

The network management system 202 is configured to manage service deliveries for the network 208. For example, the network management system 202 may determine service paths and allocate resources for services to be delivered in the communication network 200. The network management system 202 may determine a set of service links that satisfy a plurality of service demands in the communication network 200 as determined by the network optimization flow orchestrator 106. In some examples, the network management system 202 may identify a set of alternate paths for a service demand in the communication network 200, such that the alternate paths can be used to satisfy the service demand when a network failure occurs.

A service demand is a request for network resources between two nodes in the network, i.e., endpoints 204a, 204b of the service demand, and a service demand is satisfied when a service path connecting between the endpoints of the service demand is available and operable. Using the network optimization flow orchestrator 106, the network management system 202 may identify a set of service paths that is sufficient to satisfy the service demands in the communication network 200 while reducing the operation cost (e.g., in terms of equipment usage, bandwidth, processing activity, monetary cost, etc.) in the network. The network management system 202 can be a computer-based system including computer system components, desktop computers, workstations, tablets, handheld computing devices, memory devices, and/or internal network(s) connecting the components.

The network 208 facilitates communication between the network management system 202 and the components (e.g., 206) within that network 208. For example, the network management system 202 may send data to network devices to allocate resources for services in the communication network 200. Network management system 202 may also receive data from network devices that indicates the status of service links in the communication network 200. The nodes 206 may be configured to receive data over through the network and process, analyze, and query that data. Examples of the network 208 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the examples described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices) to send and receive data via applicable communication protocols, including those described above.

The network management system 202 may reside in a server or may be configured as a distributed system including network devices or as a distributed computer system including multiple servers, server farms, clouds, computers, or virtualized computing resources that interoperate to perform one or more of the processes and functionalities associated with the disclosed examples.

The network management system 202 may utilize a database that may include one or more physical or virtual storages coupled with the network management system 202. The database may be configured to store information associated with the network 208, such as the network topology, the capabilities of the network devices (e.g., nodes 206), the services and corresponding configurations provided by the network 208. The database may also be adapted to store processed information associated with the network topology and services in the network 208, so as to facilitate efficient route configurations and resource allocations to satisfy the service demands in the network 208. In some examples, the database is stored in a cloud-based server (not shown) that is accessible by the network management system 202 and/or the network devices through the network 208. The database may also reside within the network management system 202 as an internal component of the network management system 202.

As mentioned above, the endpoints 204a, 204b may be client devices. As an example, client devices may include a display such as a television, tablet, computer monitor, video conferencing console, IoT device, or laptop computer screen. Client devices may also include video/audio input devices such as a video camera, web camera, or the like. As another example, client devices may include mobile devices such as a tablet or a smartphone having display and video/audio capture capabilities.

In some examples, the network 208 may include an optical network, where the network nodes 206 are interconnected by optical fiber links. The optical fiber links may be capable of conveying a plurality of optical channels using a plurality of specified different optical wavelengths. The optical network may be based on a wavelength division multiplexing (WDM) physical layer. A WDM optical signal comprises a plurality of transmission channels, each channel carrying an information signal modulated over a carrier wavelength. For example, the network nodes 206 may be provided with the ability to switch a channel from an input fiber to an output fiber, and to add/drop traffic. The network nodes 206 may include a wavelength switch or an optical add/drop multiplexer that performs optical add, drop, and pass through. The network nodes 206 may include optical or optical/electrical elements being adapted to perform to various functions such as compensating, amplifying, switching, restoring, performing wavelength conversion of incoming optical signals, etc. The optical fiber links may include dispersion compensation fibers (DCF), optical filters, amplifiers and other relevant optical components that are used for operation of optical networks. The network management system 202 may store topologic data that includes information about optical channels and their associated wavelengths. In the context of an optical network, a service demand is a request for a wavelength between two or more nodes in the network. A circuit is provisioned to satisfy a service demand and is characterized by a route and assigned wavelength number.

Figure 3:
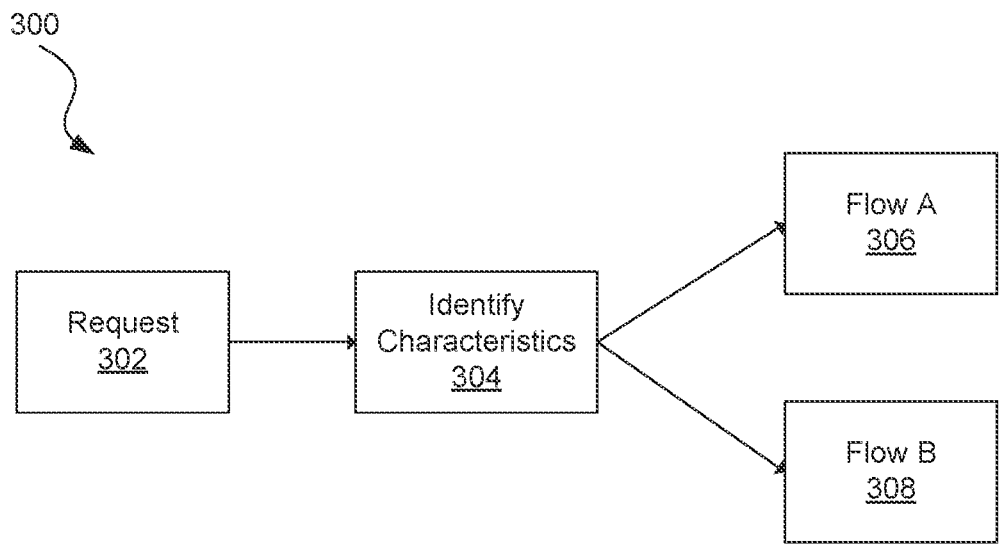
FIG. 3 is a diagram showing an illustrative process for selecting a flow based on the characteristics of network under consideration, according to principles described herein.

FIG. 3 is a diagram showing an illustrative process for selecting a flow based on the characteristics of the network under consideration. According to the present example, the process 300 begins with a request 302 received by the network optimization flow orchestrator (e.g., 106). The request 302 may be similar to the request (102) described above. The request includes a set of service demands, each demand defining at least two endpoints, a diversity policy, and a number of routes. Using the request, the network optimization flow orchestrator 106 identifies the type 304 associated with the request. The characteristics 304 may include various aspects including the type of network and the type of redundancy scheme. The type of network may include the size of the network, whether the network is a LAN or a WAN, and whether it has optical components. Other characteristics may include the diversity policy, internal relations among the services, time frame, etc.

The redundancy scheme may include one of a variety of schemes, including for example 1+1, 1+1+R, and 1++. In a communication network, such as network 208, there is often a need to provide additional protection for a type of service demands in case of a network failure. For example, one type of service demand is called the 1+1 demand, where two disjoint paths between the endpoints of the demand are required to satisfy the service demand, so that if the working path fails due to some network failure, it can be immediately replaced by the protection path. Another possible protection scheme is 1+1+R, where the demand requires two disjoint paths between the endpoints, and for any two failures that affect the two disjoint paths, an alternate path should be available to satisfy the demand. In other words, the 1+1+R demand requires additional protection to the two disjoint paths such that the service demand can still be satisfied in case of two network failures.

One type of protection scheme is called 1++, where the 1++ demand requires two disjoint paths between endpoints of a service demand, and for any single failure on the two disjoint paths, an alternate pair of disjoint paths that exclude the failed resource (link or node) and include an undamaged path, should be available to satisfy the demand. A person of skill in the art would appreciate that other levels of protection may be implemented, requiring different numbers of disjoint service link paths.

There are various possible levels of protection, each of which may have different requirement over Shared Risk Link Group ("SRLG") or Shared Risk Node Group ("SRNG") disjoint service link paths. A shared risk link group is a set of links sharing a common resource, which affects all links in the set if the common resource fails. Two service link paths are disjoint where the two service links do not share any common resources. SRLG-disjoint service link paths refer to service link paths that are not in the same SRLG. Similarly, a service demand may require that the different routes, as requested by the protection scheme, would be disjoint in their Shared Risk Node Group. A person of skill in the art would appreciate that other shared resources may affect the risks and the required protection.

Considering a particular type of network, and type of service demands indicated in the request, the network optimization flow orchestrator can select a particular optimization flow. This selection is based on the decision tree as described above. FIG. 3 illustrates two example flows—flow A 306 and flow B 308.

Figure 4:
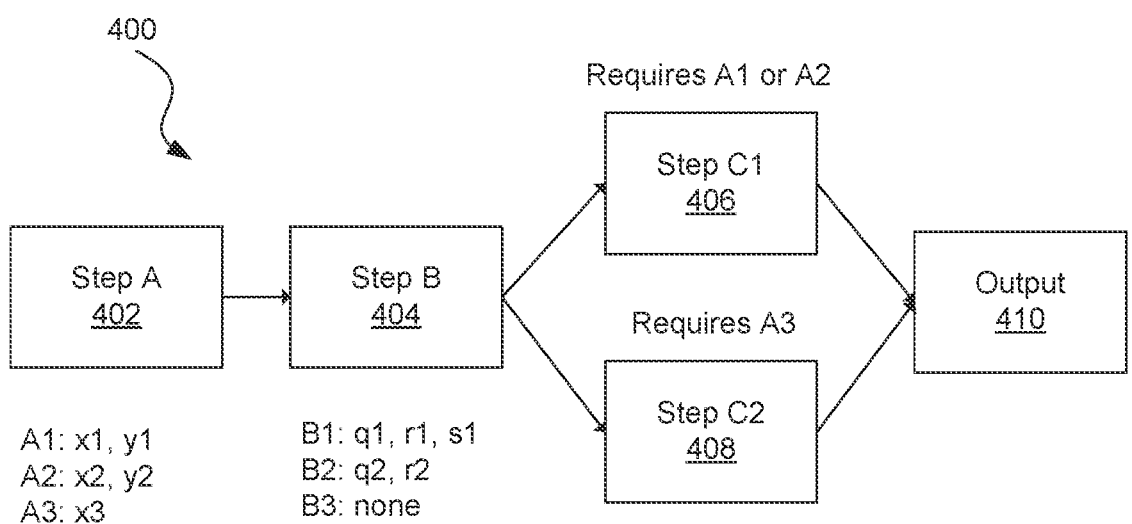
FIG. 4 is a diagram showing an illustrative process flow with varying parameters and implementations (e.g., A1, A2, A3), according to one example of principles described herein.

FIG. 4 is a diagram showing an illustrative optimization flow with varying parameters. According to the present example, the flow includes step A 402, step B 404, step C1 406, and step C2 408. In the present example, there are variations of each of the steps. Each variation uses a different set of parameters. Particularly, step A can be implemented by module A1 which uses x1 and y1, by module A2 which uses x2 and y2, or by A3 that uses x3. Modules A1, A2 and A3 may be different optimization functions that are alternatively used for the same logical step A. Step B 404 may use module B1 with q1, r1 and s1, or B2 with q2 and r2, or B3 with no parameters. The optimization flow includes two different types of modules for step C (C1 or C2) based on the modules that were used for step A and step B. In this example, if either the A1 or A2 modules are used, the optimization flow uses module C1 for step C. If the A3 module was used in step A, then the optimization flow uses module C2 408. Modules C1 406 and C2 408 may be different optimization functions.

After step C (with either C1 or C2) is applied, an output 410 is produced. The output is the solution for the demands identified in the request 102/302. In other words, the output defines the routes through the network in which the service links will be established to meet the demands of the network.

Figure 5:
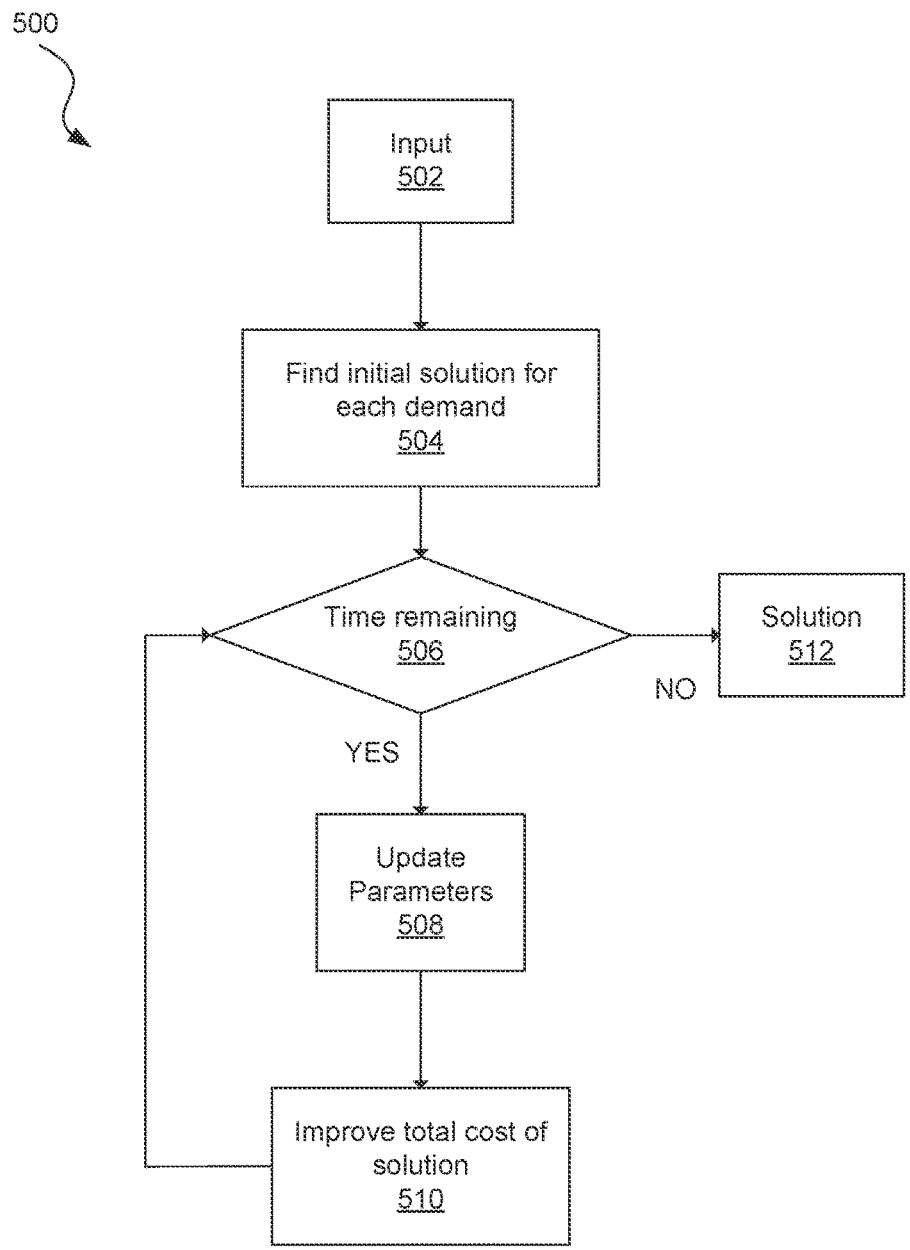
FIG. 5 is a diagram showing an illustrative process for changing parameters to improve a network configuration within a time constraint, according to one example of principles described herein.

FIG. 5 is a diagram showing an illustrative process for changing parameters to improve a network configuration within a time constraint. FIG. 5 illustrates additional details about the iterative nature of the network optimization described herein. According to the present example, the network optimization flow orchestrator 106 receives input 502. The input 502 represents the data associated with the request, which includes the characteristics of the network and the data associated with the set of service demands.

At process 504, the network optimization flow orchestrator 106 finds an initial solution for each demand. This is done using the techniques described above in which the network optimization flow orchestrator 106 selects a subset of optimization functions from a suite of optimization functions using an initial configuration.

At process 506 it is determined if there is any time left under a time constraint. If yes, then the method moves to process 508 where the parameters and subset of optimization functions are updated, and then an attempt is made in process 510 to improve the cost of the solution. In other words, the network optimization flow orchestrator 106 seeks to improve the initial solution, buy reducing the cost or improving any other type of solution ranking. When there is no time left under the time constraint, then the best solution found thus far is deemed the optimal solution 512.

Figure 6:
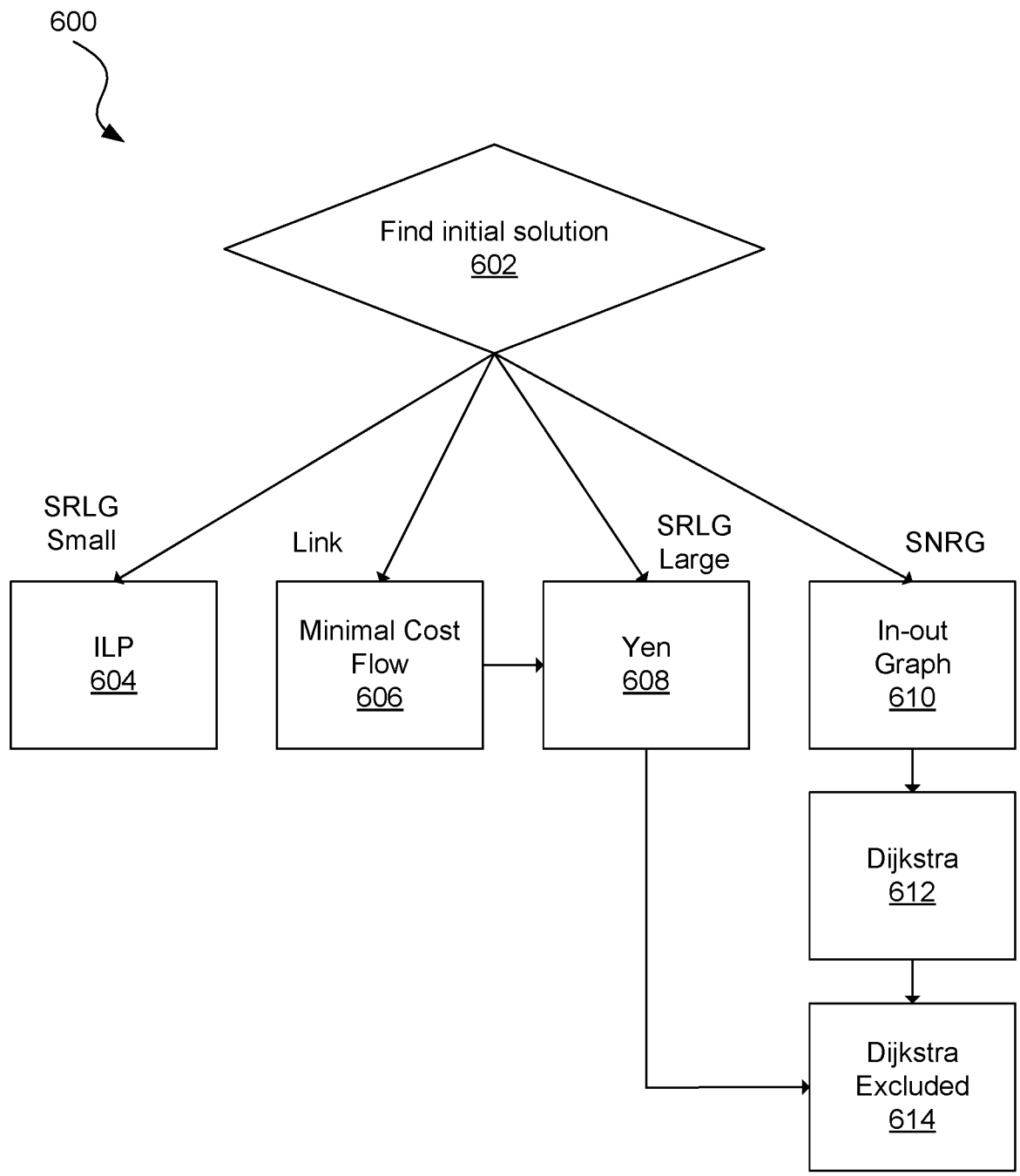
FIG. 6 is a diagram showing an illustrative process for selecting among a plurality of optimization functions for optimizing network configuration, according to one example of principles described herein.

FIG. 6 is a diagram showing an illustrative process of network optimization. According to the present example, the network optimization flow orchestrator 106 finds an initial solution 602 by using one or more optimization functions based on the characteristics of the network through which the services will be routed. FIG. 6 illustrates three different types of optimization requests with different diversity policies: link-disjoint, shared risk link group (SRLG) disjoint, and shared node risk group (SRNG) disjoint. Also, the input network's size (large/small) may affect the selection of optimization functions in certain cases.

In the present example, if the network is relatively small and the service demands require an SRLG diversity, then an ILP (Integer Linear Programming) optimization function 604 may be used.

In one example, if the service demands define a link diversity policy, then a minimal cost flow optimization function 606 may be used. The minimum cost flow optimization function seeks to find the lowest cost possible way of sending a certain amount of traffic flow through network. If the maximal flux between the selected endpoints does not comply with the requested protection scheme of the service demand, then Yen's algorithm (k-shortest paths) optimization function 608 followed by Dijkstra's algorithm with excluded edges 614 can be applied, in order to find the number of requested routes according to the protection scheme In one example, if the network is relatively large, and the service demands in the request indicate an SRLG protection scheme, then Yen's algorithm optimization function 608 may be used. In the present example, after Yen's algorithm is applied, then Dijkstra's algorithm 614 can be applied, after excluding the previously used edges ("Dijkstra Excluded").

In one example, if the protection scheme for the network is an SNRG scheme, then an in-out graph optimization function 610 is used. The in-out graph optimization function transforms the graph into a directed graph, by adding nodes and uni-directional edges. Thereafter, Dijkstra's algorithm optimization function 612 can be applied on the transformed graph.

Figure 7:
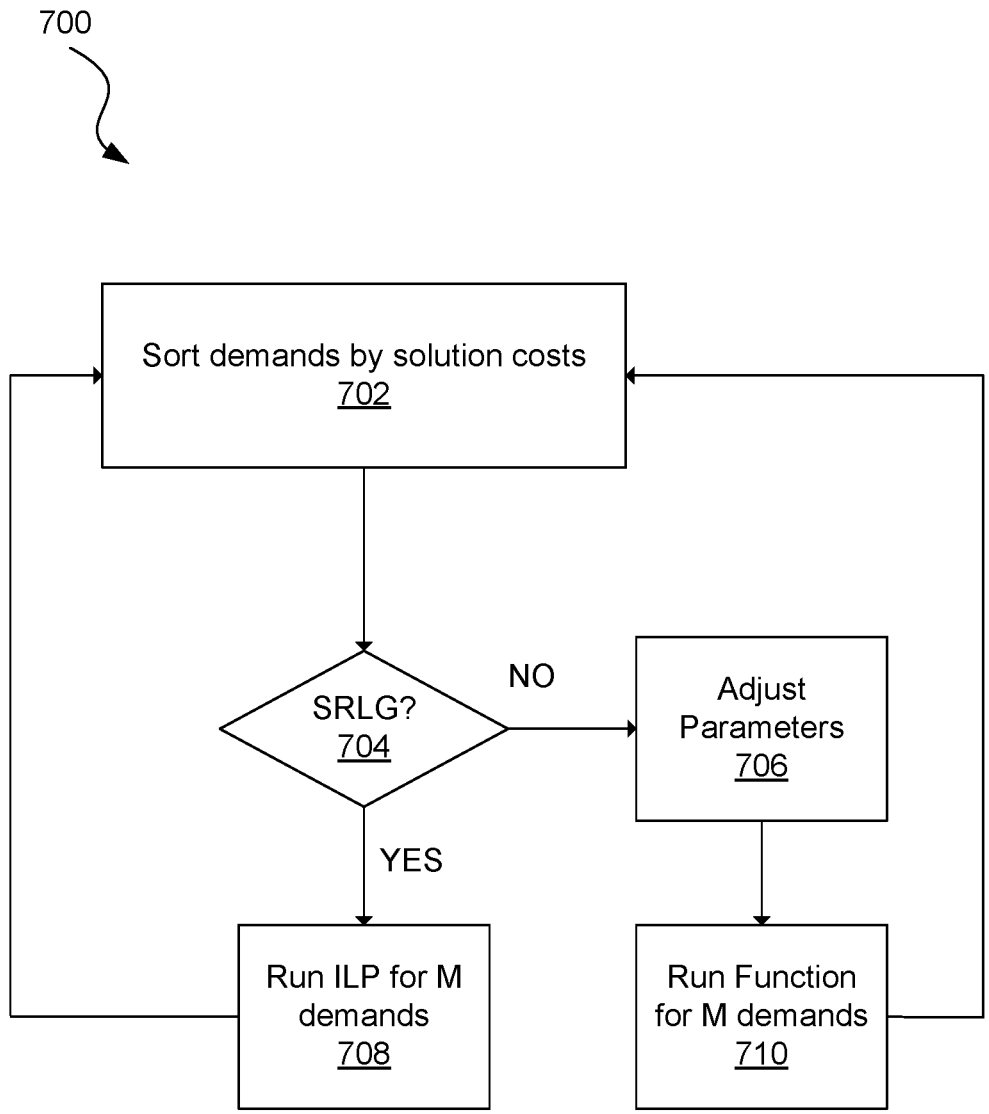
FIG. 7 is a diagram showing an illustrative process for iteratively improving a network configuration, according to one example of principles described herein.

It should be noted that the scope of implementations is not limited to any function or algorithm. For instance, other implementations may use the same or different functions and algorithms (or combinations thereof) as appropriate. FIG. 7 is a diagram showing an illustrative process 700 for iteratively improving a network optimization. The process 700 is applied to an initial solution, after such initial solution has been identified. The process 700 is repeated while there are remaining demands to be processed, and the time constraint has not yet expired.

According to the present example, the process includes sorting 702 the demands by the cost of their solution. This may be done, for example, by assigning a ranking parameter to each solution. In some examples, the ranking parameter may consider many factors as part of the cost, such as the monetary cost and the resource consumption. After an initial solution is found for each service demand, the demands are sorted according to the ranking parameter from most costly to least costly. This allows the network optimization flow orchestrator 106 to focus on improving the more costly demands as that is where there is more likely to be an improvement in cost with the expenditure of more processing resources to perform the optimization functions.

At process 704 it is determined whether a particular service demand uses an SRLG protection scheme. If so, then the network optimization flow orchestrator 106 uses ILP on M demands from the total set of demands. The value of M may be determined by probing the execution time for one demand, and then estimating the number of demands that can be processed within the time constraint. In some cases, the M demands may include each demand in the full set of demands. In some examples, the M demands may be less than the full set of demands.

If, however, at process 704 it is determined that the demands do not utilize an SRLG protection scheme, then the network optimization flow orchestrator 106 may adjust some parameters, such as link capacity, and run whichever optimization function is appropriate for the type of network again for M demands. Again, the M demands may be determined by probing the execution time for one demand, and then estimating the number of demands that can be processed within the time constraint. In some cases, the M demands may include each demand in the full set of demands. In some examples, the M demands may be less than the full set of demands.

Figure 8:
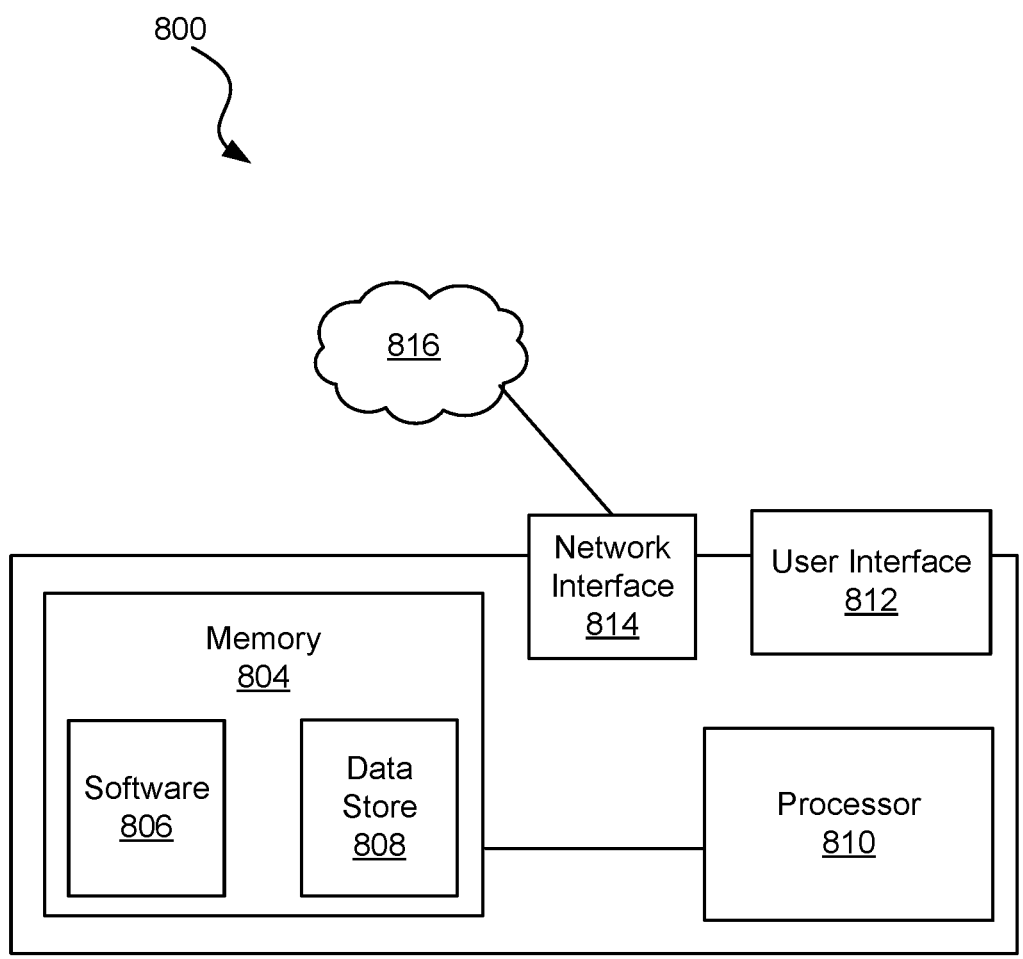
FIG. 8 is a diagram showing an illustrative computing system that may be used to perform processes related to flow orchestration for network configuration, according to one example of principles described herein.

FIG. 8 is a diagram showing an illustrative computing system 800 that may be used to perform processes related to flow orchestration for network configuration. The computing system 800 may represent the network management system 202, an endpoint 204a, 204b, any of the nodes 206, of any other computing system that performs functions described herein. In some examples, the computing system 800 may be implemented as a specially made machine that is specially programed to perform functions relating to managing a communication network. The special programming at the computing system 800 may enable network management system to determine service routes and allocate resources for services to be delivered in the network 208.

The computing system 800 may include a bus (or other communication mechanism) which interconnects subsystems and components for transferring information within the computing system 800. As shown, the computing system 800 includes one or more processors 810, user interface 812, which may include input/output ("I/O") devices, network interface 814 (e.g., a modem, Ethernet card, or any other interface configured to exchange data with a network), and one or more memories 804 storing pieces of software 806 including, for example, server app(s) and an operating system. The memory may further include a data store, and can communicate with an external database (which, for some examples, may be included within the computing system 800).

The processor 810 may be one or more processing devices configured to perform functions of the disclosed methods, such as a microprocessor manufactured by Intel™ or manufactured by AMD™. The processor 810 may comprise a single core or multiple core processors executing parallel processes simultaneously. For example, the processor 810 may be a single core processor configured with virtual processing technologies. In certain examples, the processor 810 may use logical processors to simultaneously execute and control multiple processes. The processor 810 may implement virtual machine technologies, or other technologies to provide the ability to execute, control, run, manipulate, store, etc. multiple software processes, applications, programs, etc. In some examples, the processor 810 may include a multiple-core processor arrangement (e.g., dual, quad core, etc.) configured to provide parallel processing functionalities to allow the computing system 800 to execute multiple processes simultaneously. It is appreciated that other types of processor arrangements could be implemented that provide for the capabilities disclosed herein.

The memory 804 may be a volatile or non-volatile, magnetic, semiconductor, tape, optical, removable, non-removable, or other type of storage device or tangible or non-transitory computer-readable medium that stores one or more program(s) such as server apps and an operating system. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computing system 800 may include one or more storage devices configured to store information used by processor 810 (or other components) to perform certain functions related to the disclosed examples. For example, the computing system 800 may include memory 804 that includes instructions to enable the processor 810 to execute one or more applications, such as software 806, and any other type of application or software known to be available on computer systems. Alternatively or additionally, the instructions, application programs, etc. may be stored in an external database (which can also be internal to the computing system 800) or external storage communicatively coupled with the computing system 800 (not shown), such as one or more database or memory accessible over the network 208.

The database or other external storage may be a volatile or non-volatile, magnetic, semiconductor, tape, optical, removable, non-removable, or other type of storage device or tangible or non-transitory computer-readable medium. The memory 804 and database may include one or more memory devices that store data and instructions used to perform one or more features of the disclosed examples. The memory 804 and database may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some examples, the operating system may perform operating system functions when executed by one or more processors such as the processor 810. By way of example, the operating system may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed examples may operate and function with computer systems running any type of operating system. The computing system 800 may also include software that, when executed by a processor, provides communications with network 816 through the network interface 814 and/or a direct connection to one or more network devices (e.g, 206).

In some examples, the data 808 may include, for example, network configurations, requirements of service demands, service demand graph, spanning trees, capacity of the service links in the network and each service link path, and so on. For example, the data 808 may include network topology of the network 208, capacity of the nodes (e.g., network devices) 206, and capacity of the communication link between the nodes 206. The data 808 may also include requirements of service demands and resource allocation for each service in the network 208.

The computing system 800 may also include one or more I/O devices having one or more interfaces for receiving signals or input from devices and providing signals or output to one or more devices that allow data to be received and/or transmitted by the computing system 800. For example, the computing system 800 may include interface components for interfacing with one or more input devices, such as one or more keyboards, mouse devices, and the like, that enable the computing system 800 to receive input from an operator or administrator (not shown).

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the examples disclosed herein.

What is claimed is:

1. A method performed by a computing system, the method comprising:
   receiving a request for optimizing a communication network, the request defining a set of demands for the communication network, each demand of the set of demands having two or more endpoints, a diversity policy, a number of routes, and a set of constraints including:

(a) a time constraint for the time taken by the computing system to determine a solution for the communication network; and
(b) a bit rate constraint or baud constraint;
selecting a subset of optimization functions from a set of optimization functions, the selecting being based on characteristics of the communication network and a decision tree, wherein the decision tree comprises a file format that defines a list of predefined strategies and the list of predefined strategies includes the optimization functions to be applied to an optimization problem with parameter values, number of repetitions, and time limits;
using the selected subset of optimization functions, determining an initial solution for the communication network, the initial solution comprising assignment of each of the routes within demands of the set of demands;
after determining the initial solution, determining whether time remains within the time constraint; and
for the determined time remaining within the time constraint, iteratively applying an updated subset of optimization functions with modified parameters to reduce a cost of the initial solution to produce an optimal solution,
wherein iteratively modifying the initial solution comprises:
sorting at least some of the demands of the set of demands by a ranking parameter; and
while there is remaining time, adjusting characteristics of the demands of the set of demands, starting with some higher ranked demands, to arrive at an updated solution.

2. The method of claim 1, wherein the decision tree is hardcoded.

3. The method of claim 2, wherein the decision tree comprises a file format that defines a list of strategies.

4. The method of claim 1, wherein the decision tree is a rule-based decision tree.

5. The method of claim 4, further comprising:
probing execution times of solving for demands of an optimization problem for determining the initial solution; and
using the execution times to configure a subsequent iteration.

6. The method of claim 1, wherein the decision tree is produced and updated by a machine learning function.

7. The method of claim 6, further comprising, executing the subset of optimization functions with different configurations and parameters.

8. The method of claim 7, further comprising, ranking solutions for each of a plurality of different executions of either or both of: the subset of optimization functions and parameters.

9. The method of claim 1, wherein the subset of optimization functions includes one or more of: a minimal-cost flow function, an integer linear programming function, a path finding with excluded edges function, an in-out graph, Dijkstra's algorithm, and Yen's algorithm.

10. The method of claim 1, wherein the characteristics of the communication network include a diversity policy, including either or both of a Shared Risk Link Group (SRLG) or a Shared Risk Node Group (SRNG).

11. The method of claim 1, wherein the set of constraints further comprises an Optical Signal to Noise Ratio (OSNR) constraint as to optical fiber lines.

12. The method of claim 1, wherein the set of constraints further comprises allowed area identifiers.

13. The method of claim 1, wherein the set of constraints further comprises a constraint on requested routes.

14. A method performed by a computing system, the method comprising:
receiving a request for network optimization, the request defining a set of demands, each demand of the set of demands having two or more endpoints, a diversity policy, a number of routes, and a set of constraints including:
(a) a time constraint for the time taken by the computing system to determine a solution for the communication network; and
(b) a bit rate constraint or baud constraint;
selecting one or more optimization functions from a set of optimization functions, the selecting being based on network characteristics associated with the request and a decision tree, wherein the decision tree comprises a file format that defines a list of predefined strategies and the list of predefined strategies includes the optimization functions to be applied to an optimization problem with parameter values, number of repetitions, and time limits;
using the selected one or more optimization functions, determining an initial solution for each of the demands of the set of demands;
after determining the initial solution, determining whether time remains within a time constraint, wherein the time constraint is a maximum total time for the computing system to determine a solution for the communication network; and
while time is remaining under the time constraint, iteratively applying a subset of optimization functions from the set of optimization functions with varying configurations to reduce a cost to implement a network with the demands of the set of demands,
wherein the one or more optimization functions include a bit rate constraint or baud constraint,
wherein iteratively modifying the initial solution comprises:
sorting at least some of the demands of the set of demands by a ranking parameter; and
while there is remaining time, adjusting characteristics of the demands of the set of demands, starting with some higher ranked demands, to arrive at an updated solution.

15. The method of claim 14, wherein selecting the one or more optimization functions is done using a hardcoded decision tree.

16. The method of claim 14, wherein selecting the one or more optimization functions is done using an iterative rule-based decision tree.

17. The method of claim 14, wherein selecting the one or more optimization functions is done using machine-learning.

18. The method of claim 14, wherein the network characteristics include a diversity policy, including either or both of a Shared Risk Link Group (SRLG) or a Shared Risk Node Group (SRNG).

19. The method of claim 14, wherein the time constraint is established to reach a target solution quality.

20. The method of claim 14, wherein the time constraint is set to maximize a ratio of a delta in cost reduction over a delta in execution time.

21. A computing system comprising:
a processor; and
machine readable instructions that when executed by the processor, cause the computing system to:
receive a request for optimizing a communication network, the request defining a set of demands for the communication network, each demand of the set of demands having at least two endpoints, a diversity policy, a number of routes, and a set of constraints including:
(a) a time constraint, wherein the time constraint includes a maximum runtime for the computing system to determine a solution for the communication network; and
(b) a bit rate constraint or baud constraint;
select a first subset of optimization functions from a set of optimization functions, the selecting being based on characteristics of the communication network and a decision tree, wherein the decision tree comprises a file format that defines a list of predefined strategies and the list of predefined strategies includes the optimization functions to be applied to an optimization problem with parameter values, number of repetitions, and time limits;
with the first subset of optimization functions, determine an initial solution for the communication network, the initial solution comprising assignment of the routes within at least some of the demands of the set of demands;
after determining the initial solution, determining that time remains within the time constraint; and
within the time that remains within the time constraint, iteratively apply a subset of optimization functions with modified parameters to reduce a cost of the initial solution to produce an optimal solution,
wherein iteratively modifying the initial solution comprises:
sorting at least some of the demands of the set of demands by a ranking parameter; and
while there is remaining time, adjusting characteristics of the demands of the set of demands, starting with some higher ranked demands, to arrive at an updated solution.

22. The computing system of claim 21, wherein the decision tree is one of: a hardcoded decision tree, an iterative rule-based decision tree, and a machine-learning decision tree.

23. The computing system of claim 21, wherein the subset of optimization functions includes one or more of: a minimal-cost flow function, an integer linear programming function, a path finding with excluded edges function, an in-out graph, Dijkstra's algorithm, and Yen's algorithm.

24. The computing system of claim 21, wherein the characteristics of the communication network include a diversity policy, including either or both of a Shared Risk Link Group (SRLG) or a Shared Risk Node Group (SRNG).

* * * * *